Feb. 10, 1925.
S. W. JENKS
ELECTROLYTIC REFLECTOR
Filed Sept. 11, 1922
1,525,554
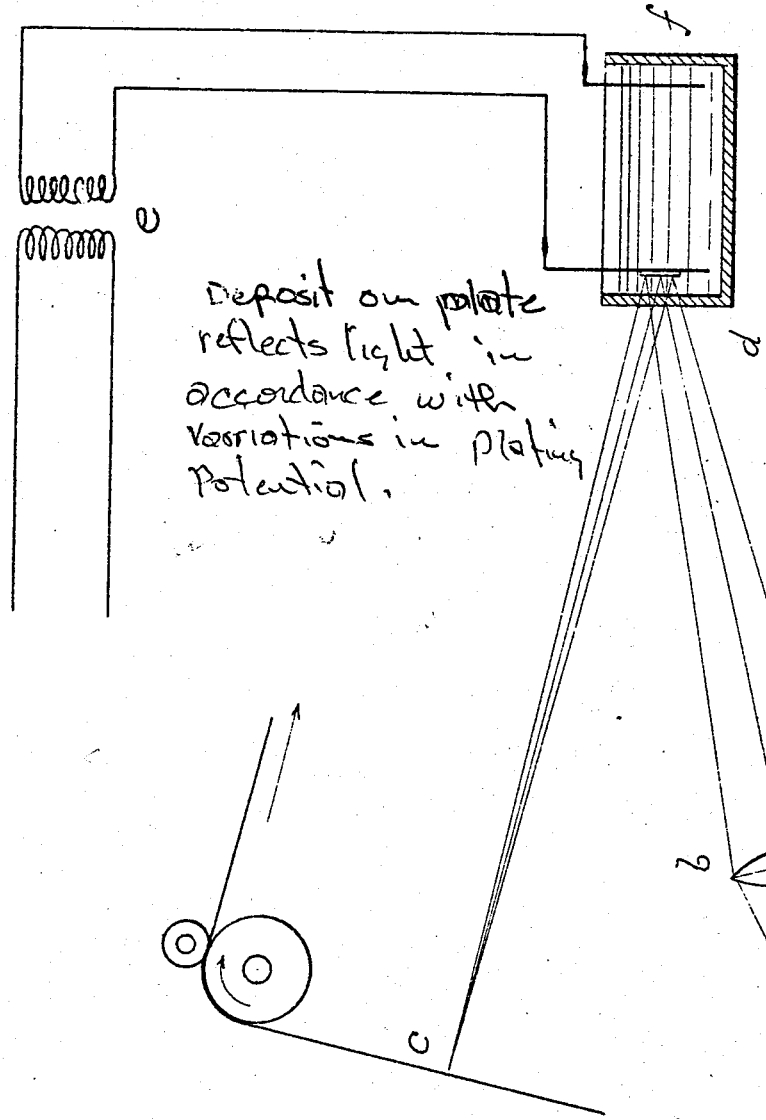
Deposit on plate reflects light in accordance with variations in plating potential.
Inventor
Stuart W Jenks Patented Feb. 10, 1925.

1,525,554

UNITED STATES PATENT OFFICE.

STUART W. JENKS, OF WASHINGTON, DISTRICT OF COLUMBIA.

ELECTROLYTIC REFLECTOR.

Application filed September 11, 1922. Serial No. 587,408.

*To all whom it may concern:*

Be it known that I, STUART W. JENKS, a citizen of the United States, residing at Washington, District of Columbia, have invented certain new and useful Improvements in Electrolytic Reflectors, of which the following is a specification.

This invention relates to apparatus for the transmission of pictures-by-radio, and has for its principal object means for changing the intensity value of the light from a light source of constant intensity, in order to produce lights and shades and half-tones on the photographic surface upon which it impinges in the apparatus at the receiving station.

In the digrammatic drawing herewith, A is a source of light of constant intensity. B a lens for gathering the diverging light rays therefrom and concentrating them on the film C, after having been reflected from the metal-faced mirror D. The mirror D is located in an electrolytic bath and is connected to a source of oscillating current, illustrated as coming from the induction coil E. The electrolytic solution is contained in the glass jar F.

The operation of the device is as follows: With the light of uniform value reflected from the surface of the mirror D, a uniform strength of light is obtained on the picture surface C. But when current begins to flow in the oscillating circuit, a deposit is formed on the face of the mirror in minute specks, which tend to reduce the area of light reflecting surface, and, therefore, the amount of light falling on the film C. When the current reverses, the mirror becomes the opposite pole of the oscillating circuit, and these particles are removed and the normal strength of the light again falls on the film C. When a less strength of current passes, obviously there is a less deposit, and, therefore, a less interruption to the reflection of the light from the mirror.

It will be found, therefore, that the amount of light reflected from the mirror is governed by the strength of the electrolytic deposit, and as the eletrolytic deposit results from the fluctuating current values in the transformer E, the amount of light which falls on the light-sensitive film C fluctuates in accord with the impressed current values, and as the film C is in motion, the result of the developable value of the exposure on the film C varies accordingly.

This electrolytic deposit may be alternately added to and taken from a transparent anode-cathode, but as this is made the subject of a separate application, a description thereof is not herein included.

What I claim is—

1. In devices of the character described, a source of light of fixed intensity, a light sensitive surface so located as to receive light from said source, and means lying between whereby an electrolytic deposit thereon reduces the amount of light passing from said source to said film.

2. In devices of the character described, a source of light of fixed intensity, a light sensitive surface so located as to receive light from said source, and means lying between whereby an electrolytic deposit alternately added to and subtracted therefrom varies the value of light passing from said source to said film.

3. In devices of the character described, a source of light of fixed intensity, a light receiving surface so located as to receive light from said source, and means lying between whereby an electrolytical deposit is alternately added to and subtracted therefrom to vary the amount of light passing from said source to said film.

In testimony whereof I have affixed my signature.

STUART W. JENKS.